United States Patent
Gautam et al.

(10) Patent No.: US 8,594,095 B1
(45) Date of Patent: Nov. 26, 2013

(54) SYSTEM, METHOD, AND COMPUTER PROGRAM FOR MODIFYING AN 802.1Q AND/OR 802.1QINQ HEADER TO REDUCE A SIZE OF AN ASSOCIATED DATA PACKET

(75) Inventors: Amit Kr. Gautam, Jagadhari (IN); Ajay Kr. Gautam, Ambala (IN)

(73) Assignee: Amdocs Software Systems Limited, Dublin (IE)

( * ) Notice: Subject to any disclaimer, the term of this patent is extended or adjusted under 35 U.S.C. 154(b) by 303 days.

(21) Appl. No.: 13/105,826

(22) Filed: May 11, 2011

(51) Int. Cl.
*H04L 12/28* (2006.01)

(52) U.S. Cl.
USPC .......................................... 370/392

(58) Field of Classification Search
USPC ......................................... 370/392; 709/249
See application file for complete search history.

(56) References Cited

U.S. PATENT DOCUMENTS

| | | | |
|---|---|---|---|
| 7,586,895 B2 | 9/2009 | Borgione | |
| 8,149,834 B1* | 4/2012 | Nielsen et al. | 370/392 |
| 2007/0258462 A1* | 11/2007 | Veits | 370/395.31 |
| 2010/0306415 A1* | 12/2010 | Sultan et al. | 709/249 |
| 2010/0322254 A1* | 12/2010 | Takacs | 370/395.53 |
| 2011/0142045 A1* | 6/2011 | Ait-Ameur et al. | 370/392 |

OTHER PUBLICATIONS

IEEE P802.1Q-REV/D1.4, Feb. 27, 2011, pp. 11, 14, 22, 148-150, 987-1005.*
Mack-Crane, "Single VID ECMP Frame Format Considerations" May 8, 2011.*
Cisco Systems, Inc., Stacked VLAN Processing, Cisco IOS Release: Multiple releases, 2005, pp. 1-22, San Jose, CA, USA, retrieved from http://www.cisco.com/en/US/docs/ios/12_0s/feature/guide/qinq. pdf on May 6, 2011.

* cited by examiner

*Primary Examiner* — Joseph Bednash
(74) *Attorney, Agent, or Firm* — Zilka-Kotab, PC

(57) ABSTRACT

A system, method, and computer program product are provided for modifying an 802.1Q and/or 802.1QinQ header to reduce a size of an associated data packet. In use, data to be communicated over a network is identified. Additionally, at least one data packet is generated for use in communicating the data over the network, where each data packet includes one of an 802.1Q and an 802.1QinQ Ethernet header. Furthermore, the Ethernet header is modified to reduce a size of the at least one data packet.

9 Claims, 8 Drawing Sheets

SYSTEM, METHOD, AND COMPUTER PROGRAM FOR MODIFYING AN 802.1Q AND/OR 802.1QINQ HEADER TO REDUCE A SIZE OF AN ASSOCIATED DATA PACKET

FIELD OF THE INVENTION

The present invention relates to data packets, and more particularly to protocols for communicating data packets.

BACKGROUND

A, Ethernet, due to its ease of deployment, continuously increasing bandwidth, declining cost and standardization efforts by Metro Ethernet Forum is fast replacing layer 2 transport technologies like Frame relay, Asynchronous Transfer Mode (ATM) and T1/E1. To be a true carrier class service, Ethernet was required to be scalable enough and have mechanisms to control connections.

IEEE 802.1Q, the standard promulgated by IEEE 802.1 workgroup for the sharing of the physical Ethernet network link by multiple independent logical channels, supported only 4096 virtual local area networks (VLANs), and with the growth of networks and the need to bridge and manage local area networks (LANs) through metropolitan area networks (MAN) or other backbone networks, this limitation started to become more acute. To improve Ethernet's scalability and manageability, IEEE introduced IEEE 802.1QinQ (commonly known as stacked VLAN) which extends the Virtual LAN tagging mechanism by tagging the tagged packet thereby producing a "double-tagged" packet (i.e. frame).

For example, in a stacked VLAN arrangement, IEEE 802.1Q VLAN tags are encapsulated within a second layer of 802.1Q tag on provider-edge (PE) routers. Thereby expanding the available VLAN space from 2^12 (VLAN id is a 12 bit field in 802.1Q frame) to 2^24. Also, this allows service providers to use a single VLAN (referred as PE-VLAN or service VLAN) to support customers who have multiple VLANs (referred as CE-CLAN or customer VLAN). The core service-provider network carries traffic with double-tagged, stacked VLAN (802.1Q-in-Q) headers of multiple customers while maintaining the customer VLAN identifier and Layer 2 protocol configurations of each customer and keeping traffic in different customer VLANs segregated.

The 802.1Q tag is 4 bytes long, such that the Q-in-Q packet therefore has two 4 bytes long 802.1Q tags. These tags are generally inserted between source MAC address (SA) and Ethertype field of an untagged packet. The first two bytes of the tag are reserved for a tag protocol identifier. Of the next two bytes, first 3 bits are used to indicate the packet priority (priority code point), 4th bit is used as canonical format indicator and the remaining 12 bits specify the VLAN to which the framer belongs.

Normal Ethernet packets have a maximum payload size of 1500 bytes. With QinQ tags, packet header and other overhead the efficiency can be calculated as payload size divided by packet size (1500/1546), or 97.024%. Unfortunately, the protocols described above exhibit various limitations, such as redundancy, increased data packet size by virtue of the double-tagged" packet, etc. There is thus a need for addressing these and/or other issues associated with the prior art.

SUMMARY

A system, method, and computer program product are provided for modifying an 802.1Q and/or 802.1QinQ header to reduce a size of an associated data packet. In use, data to be communicated over a network is identified. Additionally, at least one data packet is generated for use in communicating the data over the network, where each data packet includes one of an 802.1Q or an 802.1QinQ Ethernet header. Furthermore, the Ethernet header is modified to reduce a size of the at least one data packet.

DETAILED DESCRIPTION

Figure 1:
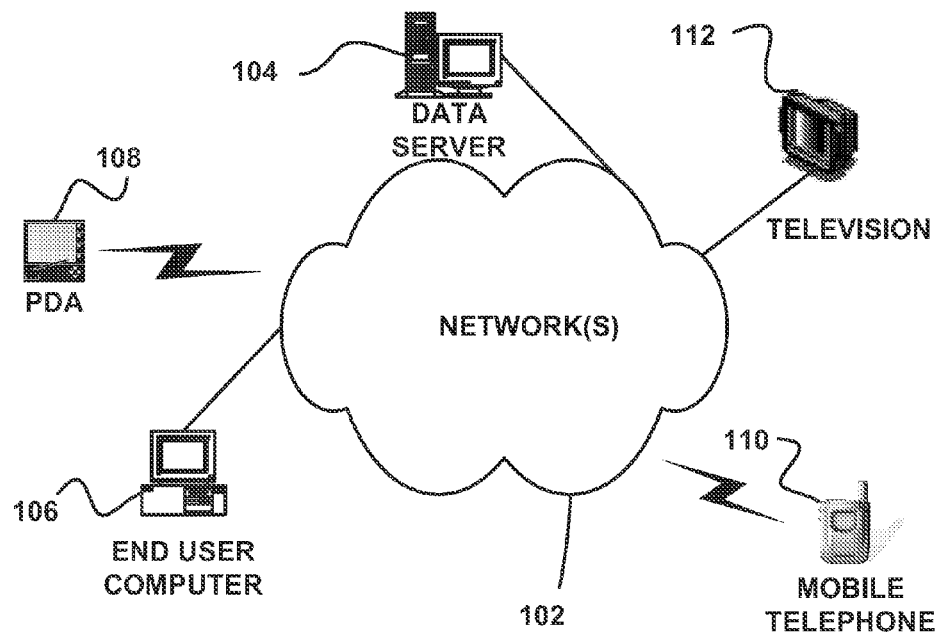
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
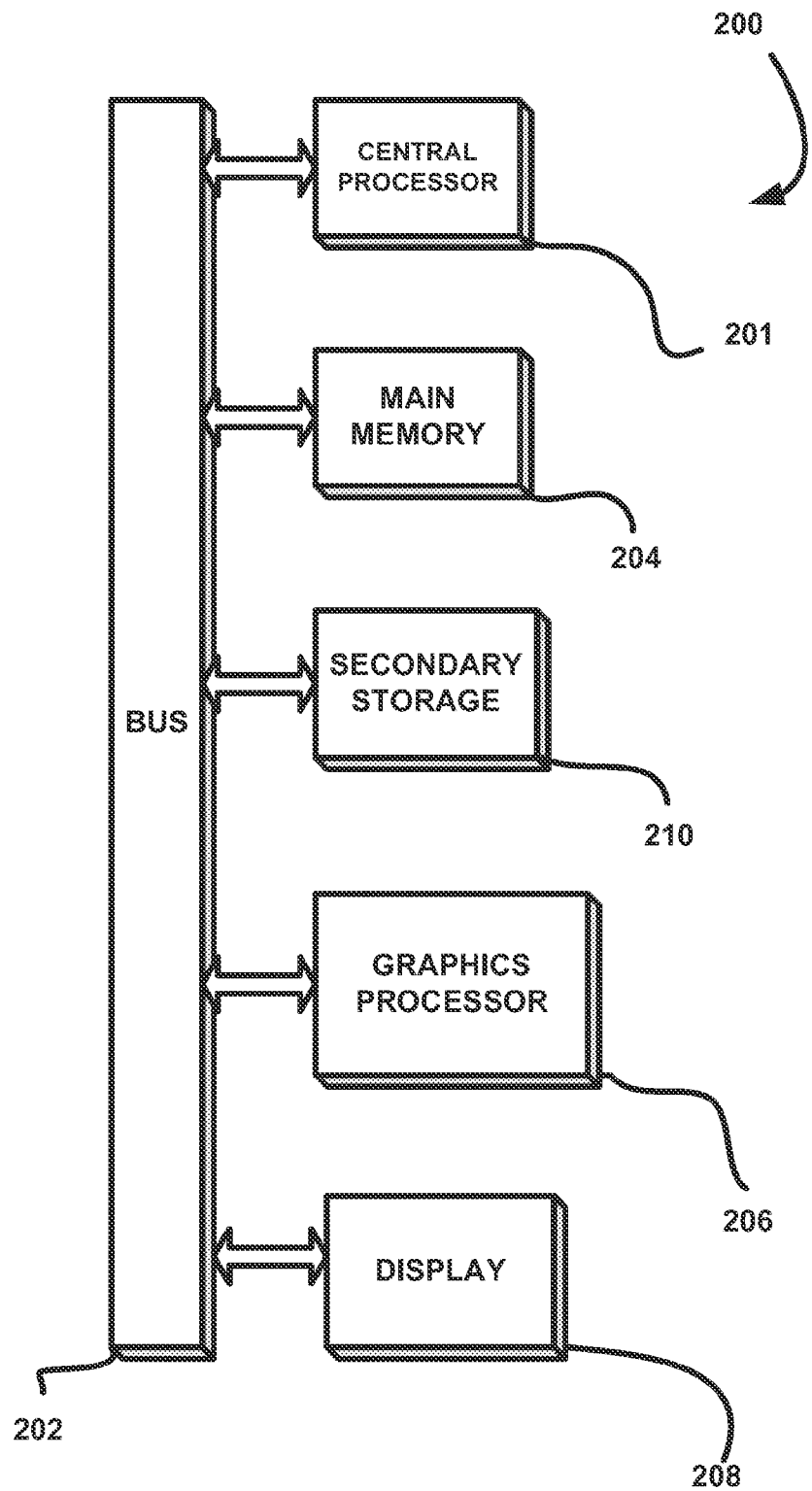
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example).

Memory 204, storage 210 and/or any other storage are possible examples of tangible computer-readable media.

Figure 3:
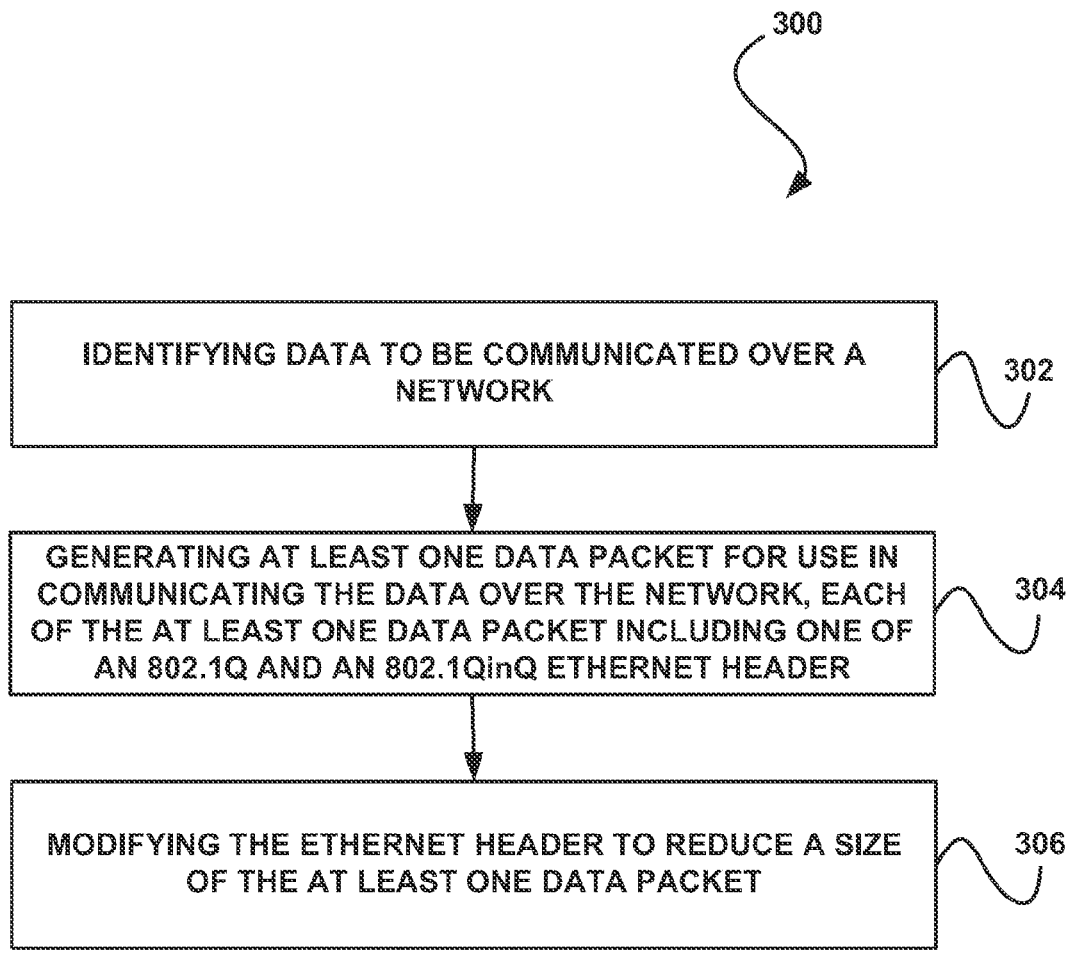
FIG. 3 illustrates a method for modifying an 802.1Q and/or 802.1QinQ header to reduce a size of an associated data packet, in accordance with one embodiment.

FIG. 3 illustrates a method 300 for modifying an 802.1Q and/or 802.1QinQ header to reduce a size of an associated data packet, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, data to be communicated over a network is identified. In the context of the present description, the data may include any type of data capable of communicated (e.g. transmitted, etc.) over a network. For example, the data may include a file, a webpage, an email message, etc.

To this end, the network may include any network capable of communicating the data from one location in the network to another location in the network [e.g. a local area network (LAN), etc.). Specifically, the network may include an Ethernet, where data is transmitted via data packets (e.g. Ethernet packets) formatted in accordance with the Institute of Electrical and Electronics Engineers (IEEE) 802.1Q and/or IEEE 802.1QinQ. According to the 802.1Q and 802.1QinQ standards, the data packets may be transmitted with one or more virtual local area network (VLAN) tags, as described in more detail below.

In one embodiment, the data may be identified by a device utilized for communicating the data over the network. For example, the data may be identified by a router. As an option, the data may be identified in response to a request to communicate the data over the network Additionally, at least one data packet is generated for use in communicating the data over the network, where each data packet includes one of an 802.1Q and an 802.1QinQ Ethernet header. Note operation 304. As noted above, each data packet generated for communicating the data over the network is formatted in accordance with the 802.1Q or 802.1QinQ standard. Thus, each data packet includes an 802.1Q or 802.1QinQ Ethernet header having one or more WAN tags. In particular, the 802.1Q Ethernet header may have a single VLAN tag, whereas the 802.1QinQ Ethernet header may have two VLAN tags.

The VLAN tag is a 32-bit (four byte) field between the source media access control (MAC) address field and the EtherType field of the original data packet. The VLAN tag has a predefined format, namely two bytes used for a tag protocol identifier (TPID), and another two bytes for tag control information (TCI), including a first three bits for prior code point (PCP) which indicates a priority of the data packet, a fourth bit for canonical format indicator (CFI), and the remaining twelve bits for a VLAN identifier (VLAN ID) identifying the VLAN to which the data packet belongs.

Furthermore, as shown in operation 306, the Ethernet header is modified to reduce a size of the at least one data packet. Such modification may be performed at a router (or other device) used using the data packet to communicate the data over the network, such as the same router used for generating the data packet. In one embodiment, the VLAN tag may be modified to reduce the size of the data packet. For example, one or more fields of the VLAN tag may be modified, such as the TPID and/or VLAN ID. Optionally, the modification may be based on whether the Ethernet header is an 802.1Q Ethernet header or an 802.1QinQ Ethernet header.

In one embodiment where the Ethernet header is an 802.1Q Ethernet header, the modification may include removing a portion of the VLAN ID from the VLAN ID field of the VLAN tag and overriding a portion of the TPID of the VLAN tag with the removed portion of the VLAN ID. For example, the TPID may be a predefined field with a portion of its bits (e.g. the last eight bits set to the value "0". Thus, the portion of the TPID having values set to "0" may be written over with a same size portion removed from the VLAN ID. Accordingly, the size of the data packet may be reduced (i.e. in bytes) by removing the portion of the VLAN ID from the VLAN tag of the Ethernet header of the data packet.

In another embodiment where the Ethernet header is an 802.1QinQ Ethernet header, the modification may include removing a TPID from one of the VLAN tags in the Ethernet header. For example, a first one of the VLAN tags may include a TPID for a provider-edge device (e.g. provider-edge router) and a second one of the VLAN tags may include a TPID for a customer-edge device (e.g. customer-edge router). Accordingly, a combination of the TPID for the provider-edge device and the TPID for the customer-edge device may be mapped to a new TPID (e.g. where such mapping is stored for reference). As noted above, a TPID may be removed from the one of the VLAN tags, and the TPID from the other one of the VLAN tags may then be replaced with the new TPID mapped to the removed TPID and the replaced TPID. Accordingly, the size of the data packet may be reduced (i.e. in bytes) by removing the TPID from one of the VLAN tags of the Ethernet header of the data packet.

In yet another embodiment where the Ethernet header is an 802.1Q Ethernet header, the modification may include identifying a VLAN tag common to a plurality of the data packets, and distributing data in such VLAN tag across the Ethernet headers of such data packets. For example, the VLAN tag may be associated with a customer-edge device, such that each data packet associated with the customer-edge device may have a VLAN tag with a same VLAN ID. To this end, the VLAN ID may be removed from each of the Ethernet headers and instead distributed across the Ethernet headers (i.e. by storing different portions of the VLAN ID in the Ethernet headers). This may allow for the size of a given one of the data packets to be reduced (i.e. in bytes) by the size of the portion of the VLAN ID removed from VLAN tag of the Ethernet header of the data packet.

It should be noted that the modifications to the Ethernet header, as described above, may be implemented based on an amendment to the 802.1Q and/or 802.1QinQ standards. Such amendment may take the form of a new Ethernet standard. In this way, a device receiving the data packets may process the data packets according to the new Ethernet standard, to correctly interpret the Ethernet header of the data packets.

While various modifications have been described above in the context of reducing a size of the data packet, further modifications may optionally also be employed for reducing the size of the data packet. Similarly, the aforementioned modifications may optionally be utilized in combination, as desired. By amending the 802.1Q and/or 802.1QinQ standards to reduce the size of data packets in the manner described above, a net bit rate associated with communicating the associated data over the network may be improved.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
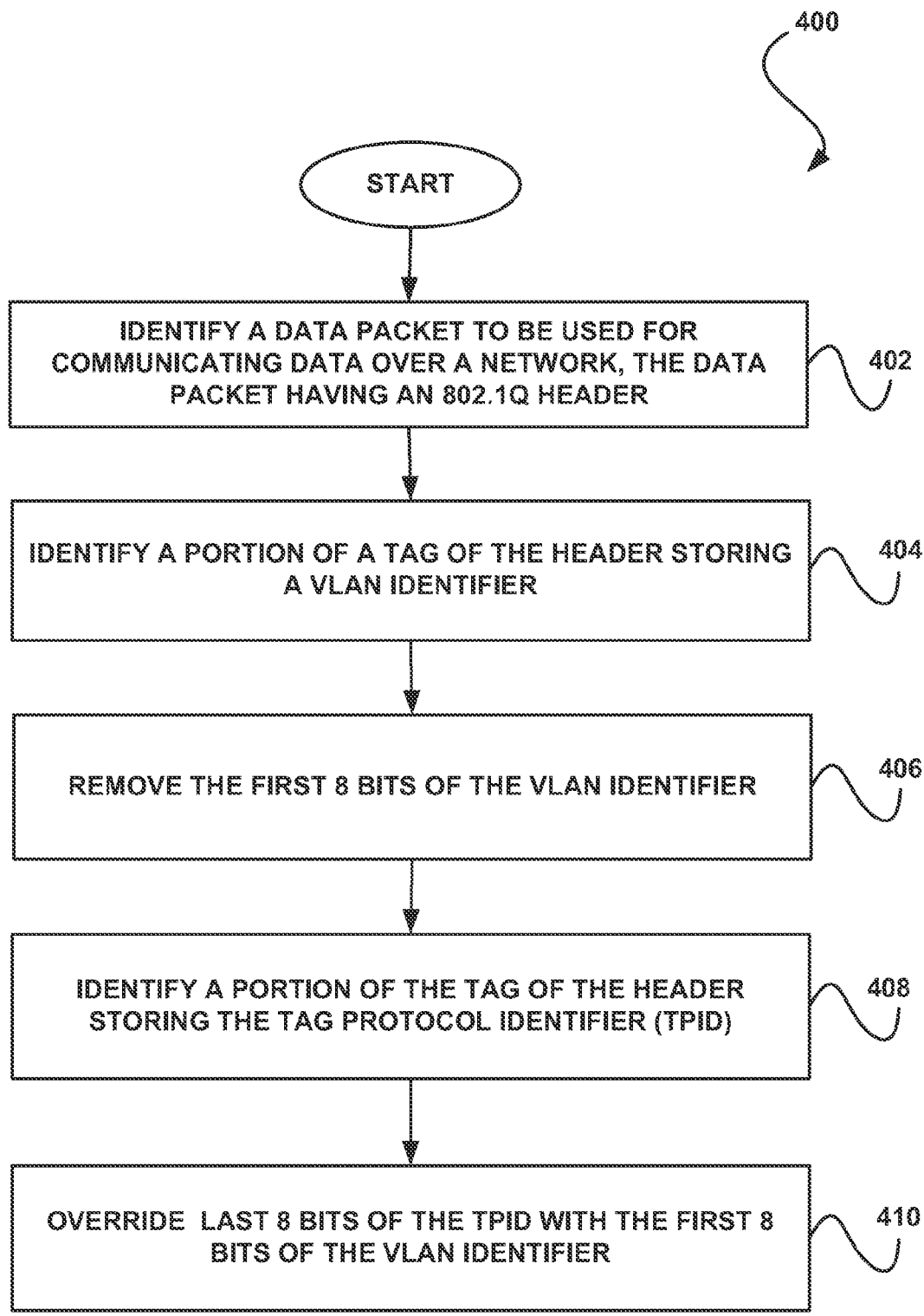
FIG. 4 illustrates a method for modifying an 802.1Q header to reduce a size of an associated data packet, in accordance with another embodiment.

FIG. 4 illustrates a method 400 for modifying an 802.1Q header to reduce a size of an associated data packet, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in operation 402, a data packet to be used for communicating data over a network is identified, where the data packet has an 802.1Q Ethernet header. For example, the data packet may be identified in response to the creation thereof. In this way, the data packet may be modified in the manner described below.

Additionally, a portion of a tag of the Ethernet header storing a VLAN ID is identified, as shown in operation 404. In the present embodiment, the tag includes a VLAN tag. As described above, the 802.1Q standard may indicate that the VLAN ID is located in the last 12 bits of the tag of the Ethernet header. Thus, based on the 802.1Q standard, the VLAN ID may be identified from the last 12 bits of the tag of the Ethernet header.

Further, as shown in operation 406, the first eight bits of the VLAN ID are removed (i.e. from the tag). The first eight bits may be removed from the tag and stored in temporary memory, for example. Moreover, a portion of the tag of the Ethernet header storing the TPID is identified, as shown in operation 408. Similar to the VLAN ID, the TPID may be identified based on the 802.1Q standard. In particular, the 802.1Q standard may indicate the that TPID is stored in a first two bytes of the tag of the Ethernet header, such that the TPID may be identified from the first two bytes of the tag.

The first eight bits of the VLAN ID are then used to override a last eight bits of the TPID. Note operation 410. Thus, the first eight bits of the VLAN ID may be removed from the VLAN ID field of the tag and used to write over the last eight bits of the TPID. This may reduce the size of the Ethernet header, and therefore the data packet, by eight bits (two bytes), namely via the removal of the first eight bits of the VLAN ID.

For example, of each 32-bit 802.1Q tag, only a last 16 bits may be used for dynamic information. TPID in the 802.1Q tag may be set to a predefined value, such as 0x8100, 0x9100, or any value that has the last eight bits set to "0". As described above, this information may be used to reduce the Ethernet header size, and thus the data packet size. Specifically, the Ethernet header may be modified by removing a first eight bits of a virtual local area network identifier from a tag of the Ethernet header, and overriding a last eight bits of a tag protocol identifier included in the tag of the Ethernet header with the first eight bits of the virtual local area network identifier.

Table 1 illustrates pseudo-code for implementing the method 400 described above. Of course, it should be noted that the pseudo-code shown in Table 1 is set forth for illustrative purposes only and thus should not be construed as limiting in any manner.

TABLE 1

Step 1: Var$_{partVlanId}$=POP (802.1Q, 4) //remove 4$^{th}$ byte containing 8 bits of VLAN ID from the original 802.1Q frame.
Step 2: OR (TPID$_{802.1Q}$,Var$_{partVlanId}$) //TPID which is 0x8100, 0x9100, 0x9200 or 0x9300 has last 8 bits set to zero. Override (OR) these TPID bits with the 8 bit partial VLAN ID extracted in Step 1.
Note that ORing VLAN ID's 8 bit to TPID
will still keep TPID's value > 0x0600. This will ensure that EtherType value is interpreted correctly.

As a further option, an 802.1QinQ data packet can be created from the modified 802.1Q data packet described above by tagging the modified 802.1Q Ethernet header with another modified 802.1Q tag (e.g. modified as described above in the method 400 of FIG. 4). As yet another option, the method 400 may optionally be implemented in partial form with respect to 802.1QinQ data packets, where only the inner tag of the 802.1QinQ Ethernet header is modified and the outer tag of the 802.1QinQ Ethernet header is left unchanged.

As noted above, modifying the data packet using the method 400 results in two bytes per Ethernet packet being saved, and increases the efficiency of communicating the data packet (designated as payload size/data packet size) to 97.15%. It should be noted that the percentage saving increases as the payload gets smaller. Moreover, as a result of the Ethernet header modification described above, stack operations may be easier to implement at the router performing the modification, such that the processing overhead may be minimal.

Figure 5:
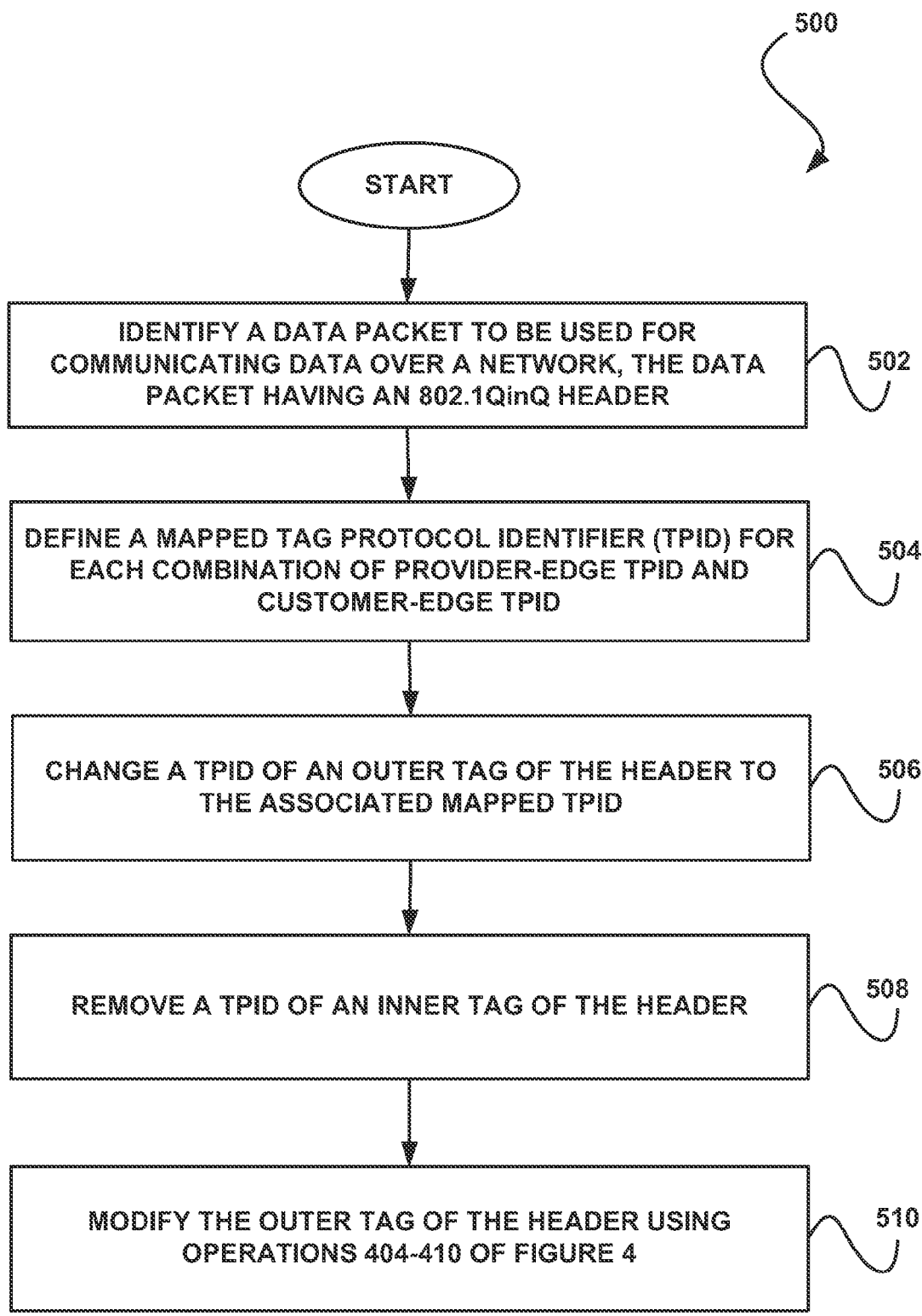
FIG. 5 illustrates a method for modifying an 802.1QinQ header to reduce a size of an associated data packet, in accordance with yet another embodiment.

FIG. 5 illustrates a method 500 for modifying an 802.1QinQ header to reduce a size of an associated data packet, in accordance with yet another embodiment. As an option, the method 500 may be carried out in the context of the details of FIGS. 1-4. Of course, however, the method 500 may be carried out in any desired environment. Again, the aforementioned definitions may equally apply to the description below.

As shown in operation 502, a data packet to be used for communicating data over a network is identified, where the data packet has an 802.1QMQ Ethernet header. For example, the data packet may be identified in response to the creation thereof. In this way, the data packet may be modified in the manner described below.

Additionally, a mapped TPID is defined for each combination of provider-edge TPID and customer-edge TPID. Note operation 504. For example, a new TPID may be mapped to each combination of provider-edge (PE-VLAN) TPID and customer-edge (CE-VLAN) TPID. The mappings may be predefined in memory for example, for reference at a receiving end of the data packet. Table 2 illustrates an example of the aforementioned described mapping. It should be noted that the mapping shown in Table 2, and particularly the values shown, are set forth for illustrative purposes only, and should not be construed as limiting in any manner.

TABLE 2

| TPID$_{PE-VLAN}$ | TPID$_{CE-VLAN}$ | Mapped TPID |
|---|---|---|
| 0x8100 | 0x8100 | 0xC000 |
| 0x9100 | 0x8100 | 0xC100 |
| 0x9200 | 0x9200 | 0xC200 |

A TPID of an outer tag of the Ethernet header is changed to an associated mapped TPID, as shown in operation 506. In the present embodiment, the tag includes a VLAN tag. The outer tag may include a second tag (in sequence) included in the Ethernet header. For example, the outer tag may be associated with the CE-VLAN.

In one embodiment, a PE-VLAN TPID and a CE-VLAN TPID included in the Ethernet header may be determined. The mapped TPID assigned to the combination of the determined PE-VLAN TPID and CE-VLAN TPID may then be identified from the predefined mappings described above. In this way, the TPID of the outer tag of the Ethernet header may be changed to the one of the mapped TPIDs defined for the determined PE-VLAN TPID and CE-VLAN TPID.

Furthermore, a TPID of an inner tag of the Ethernet header is removed, as shown in operation 508. The inner tag may include a first tag (in sequence) included in the Ethernet header. For example, the inner tag may be associated with the PE-VLAN. The TPID of the inner tag may be removed since the mapped TPID stored in the Ethernet header, per operation 506, may be used to reference the TPID of the inner tag and the original TPID of the outer tag.

Still yet, the outer tag of the Ethernet header is modified using operations 404-410 of FIG. 4. Note operation 510. In one embodiment, operation 510 may be optional. For example, operation 510 may be used to further reduce the size of the Ethernet header, and thus the data packet.

To this end, both inner and outer tags may have a 2 byte long TPID field that can be same or different, but in any case may be set from a predefined set of values. This may allow a mapped TPID to be used in place of the associated PE-VLAN TPID/CE-VLAN ID, for reducing the size of the Ethernet header.

By modifying the Ethernet header as described via the method 500 above, the size of the Ethernet header, and therefore the data packet, may be reduced by three bytes, namely via the removal of the TPID of the inner tag and the further modification described in FIG. 4. Further, the efficiency in communicating the data over the network may be increased to 97.213%. Note that percentage saving may increase as the payload gets smaller. In addition, processing overhead may be minimal as the operations involved are simple.

Table 3 illustrates pseudo-code for implementing the method 500 described above. Of course, it should be noted that the pseudo-code shown in Table 3 is set forth for illustrative purposes only and thus should not be construed as limiting in any manner.

TABLE 3

Step 1: Define a mapping as f:
(TPID$_{PE-VLAN}$, TPID$_{CE-VLAN}$) → (Mapped TPID)
Step 2: Change TPID of outer tag to Mapped TPID
Step 3: Remove TPID of inner tag
Step 4 (optional): Modify the outer tag as per the process outlined in Table 1.

As a further option to the mapping described above, the mapped TPID may be assigned to not only the combination of PE-VLAN TPID/CE-VLAN TPID, but also to the EtherType. Thus, each mapped TPID may reference a combination of PE-VLAN TPID, CE-VLAN MD, and EtherType. Using the mapped TPID, both the CE-VLAN TPID and the EtherType may be removed from the inner tag of the Ethernet header, before replacing the PE-VLAN TPID with the mapped TPID. This further option may reduce the size of the Ethernet header by an additional two types (i.e. as a result of the removal of the EtherType field).

Figure 6A:
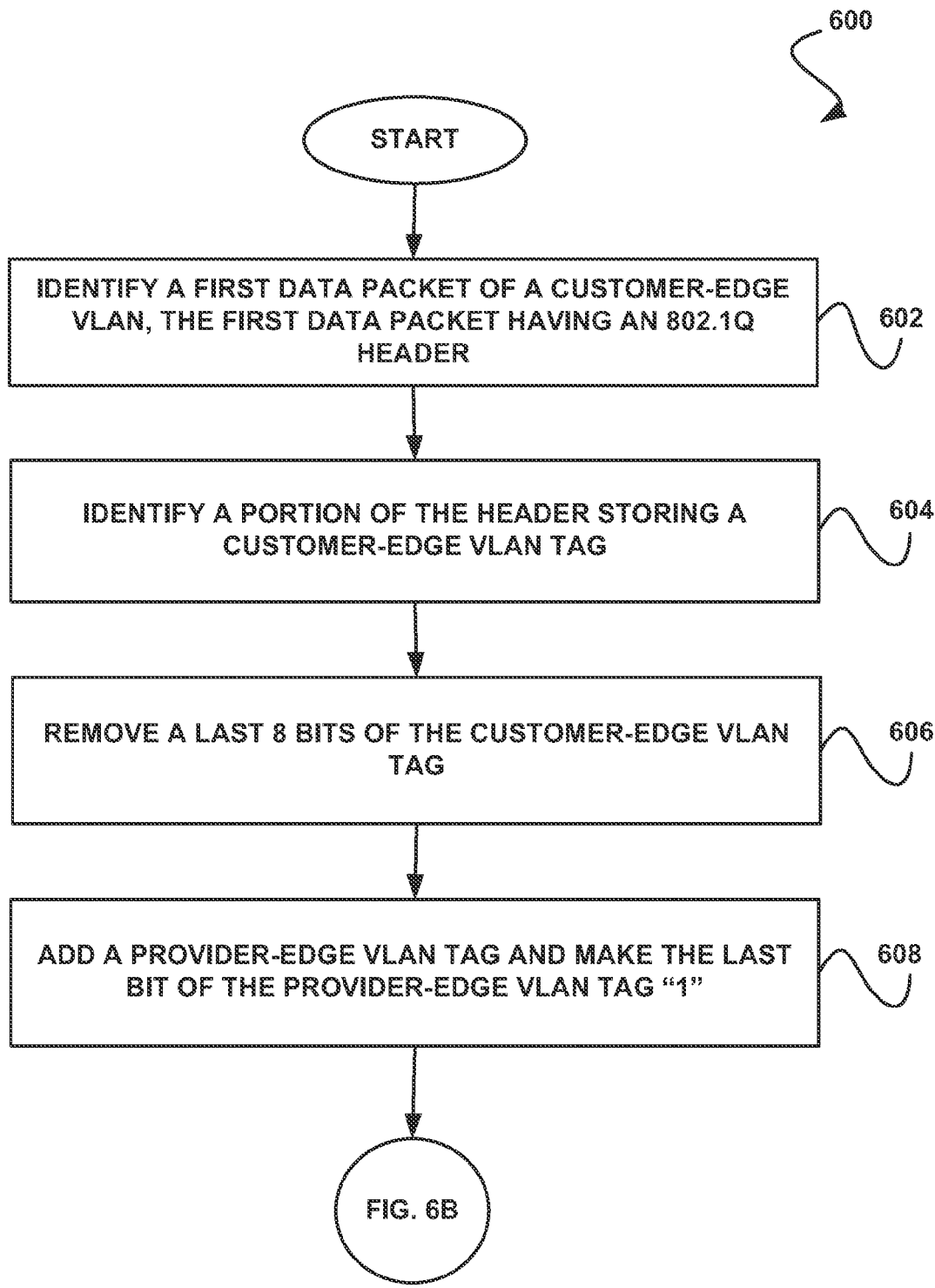
FIGS. 6A-C illustrates a method for modifying an 802.1Q header to eliminate redundancy in at least one data packet, in accordance with still yet another embodiment.
Figure 6B:
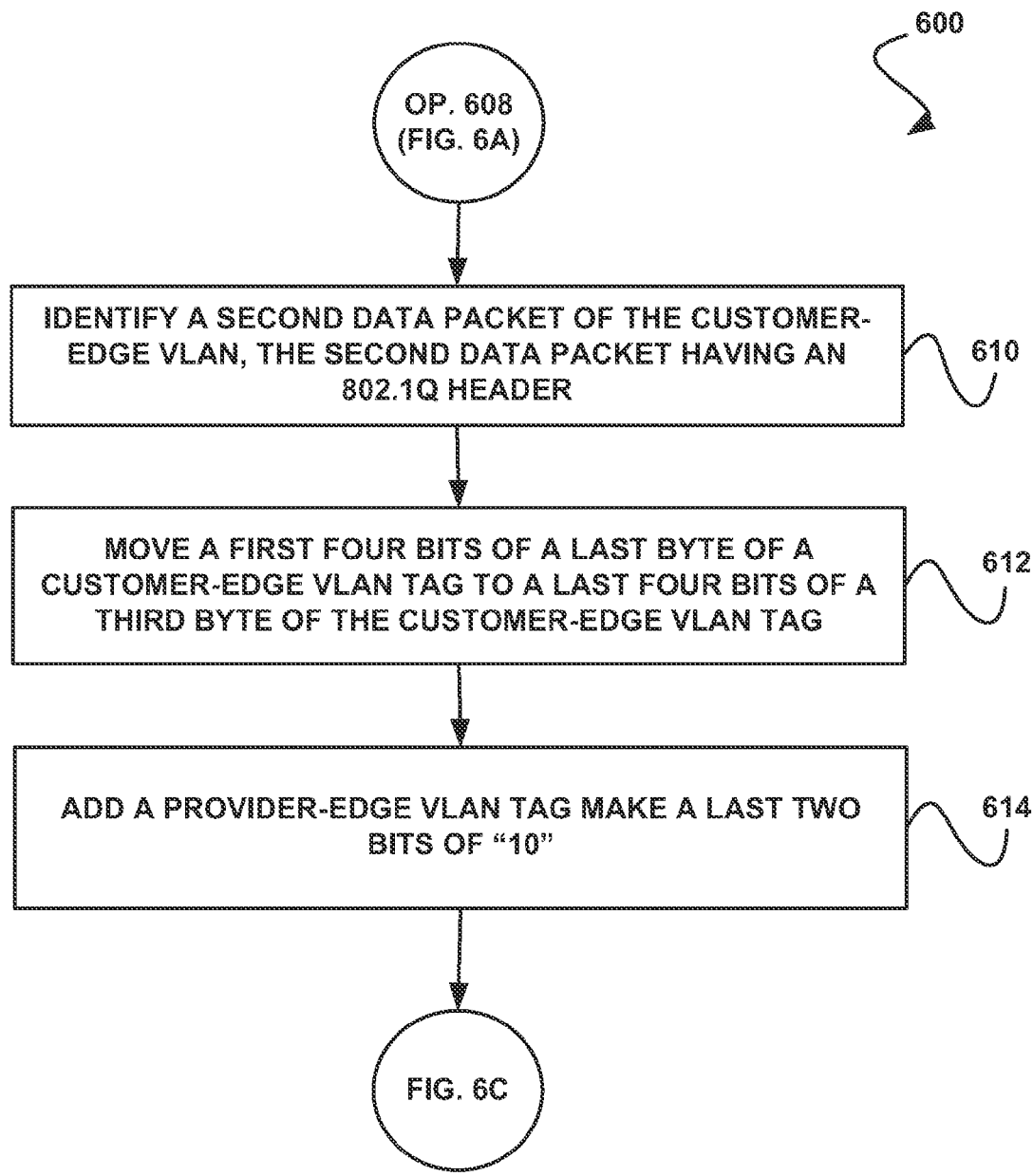
Figure 6C:
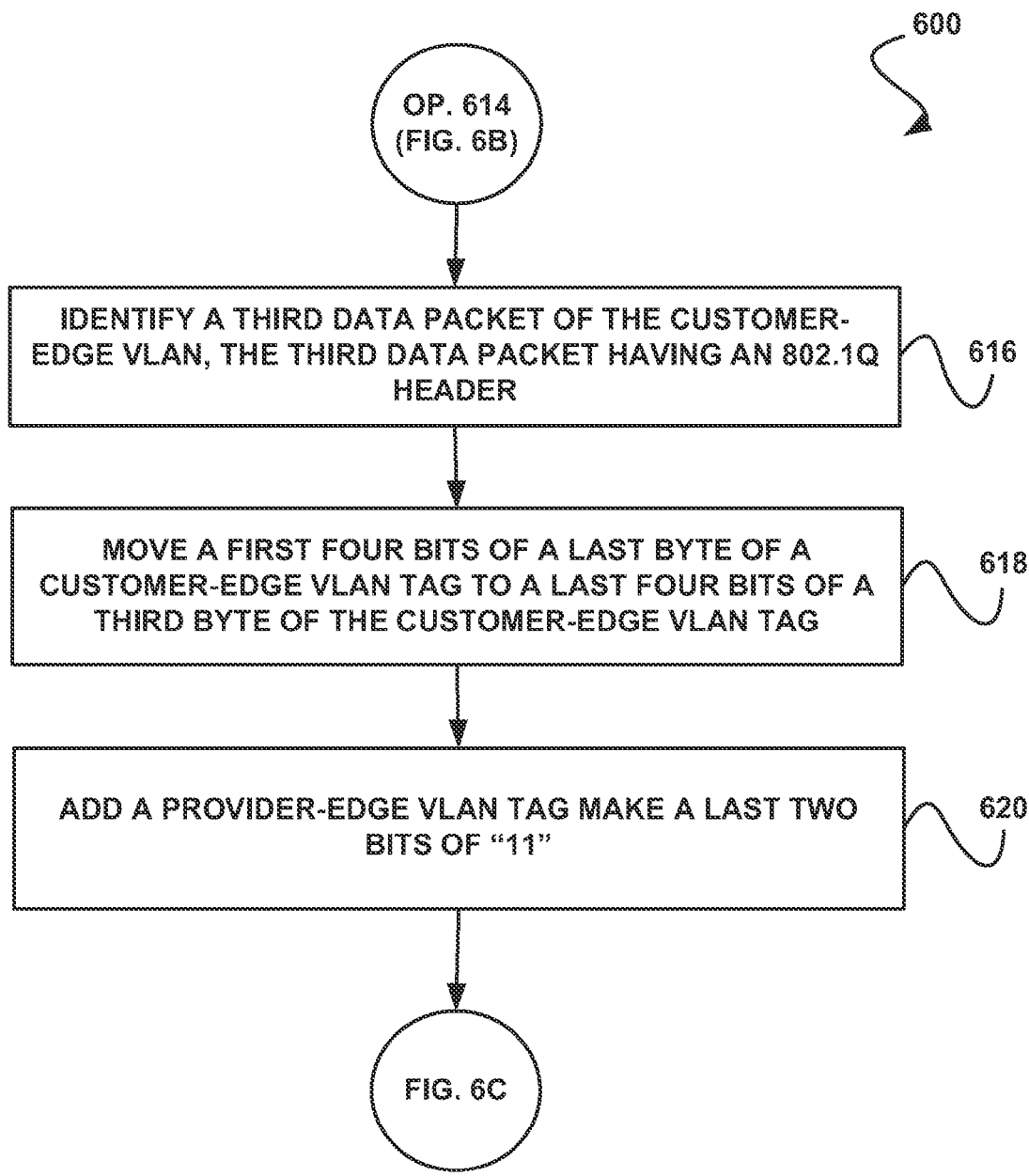

FIGS. 6A-C illustrates a method 600 for modifying an 802.1Q header to eliminate redundancy in at least one data packet, in accordance with still yet another embodiment. As an option, the method 600 may be carried out in the context of the details of FIGS. 1-5. Of course, however, the method 600 may be carried out in any desired environment. Again, the aforementioned definitions may equally apply to the description below.

As shown in operation 602, a first data packet of a CE-VLAN is identified, where the first data packet has an 802.1Q Ethernet header. For example, the first data packet may be identified in response to the creation thereof. In this way, the data packet may be modified in the manner described below.

Additionally, a portion of the Ethernet header of the first data packet storing a CE-VLAN tag is identified, as shown in operation 604. The CE-VLAN tag may include a tag of the Ethernet header of the first data packet that is associated with the CE-VLAN. The portion may be identified based on the 802.1Q standard. For example, the 802.1Q standard may indicate that the CE-VLAN tag of the Ethernet header is stored at certain bytes within the Ethernet header.

Further, as shown in operation 606, a last eight bits of the CE-VLAN tag of the Ethernet header of the first data packet are removed from the Ethernet header of the first data packet. The last eight bits may represent a portion of a CE-VLAN ID (i.e. an ID of the CE-VLAN), as defined by the 802.1Q standard. Optionally, the removed last eight bits of the CE-VLAN tag of the Ethernet header of the first data packet may be stored in temporary memory.

Moreover, a PE-VLAN tag is added to the Ethernet header of the first data packet, and a last bit of the PE-VLAN tag is set to "1". Note operation 608. The PE-VLAN tag may be added to the Ethernet header of the first data packet according to the 802.1QinQ standard. In addition, the PE-VLAN tag added to the Ethernet header of the first data packet may be configured according to the 802.1Q standard.

As shown in operation 610, a second data packet of the CE-VLAN is identified, where the second data packet also has an 802.1Q Ethernet header. The second data packet may include a data packet used for communicating a different portion of the same data to be communicated using the first data packet described above. In this way, both the first and second data packets may be associated with the same CE-VLAN.

Additionally, a first four bits of a last byte of a CE-VLAN tag of the Ethernet header of the second data packet is moved to a last four bits of a third byte of the CE-VLAN tag of the Ethernet header of the second data packet. Note operation 612. Still yet, a PE-VLAN tag is added to the Ethernet header of the second data packet and a last two bits of the PE-VLAN tag added to the Ethernet header of the second data packet are set to "10". Note operation 614.

As further shown in operation 616, a third data packet of the CE-VLAN is identified, where the third data packet has an 802.1Q Ethernet header. The third data packet may include a data packet used for communicating a different portion of the same data to be communicated using the first data packet and the second data packet described above. In this way, the first, second and third data packets may be associated with the same CE-VLAN.

Moreover, a first four bits of a last byte of a CE-VLAN tag of the Ethernet header of the third data packet is moved to a last four bits of a third byte of the CE-WAN tag of the Ethernet header of the third data packet. Note operation 618, A PE-VLAN tag is then added to the Ethernet header of the third data packet, and last two bits of the PE-VLAN tag added to the Ethernet header of the third data packet are set to "11."

To this end, the CE-VLAN ID which is common to each of the data packets (e.g. used for communicating a set of data over a network) may be distributed across the Ethernet headers of the data packets, instead of individually stored in each of Ethernet headers of the data packets. In this way, redundancy across the data packets may be removed. It should be noted that while only three data packets are described above, it should be noted that the CE-VLAN ID may be distributed across any number of data packets having the same CE-VLAN ID stored in their Ethernet headers.

For example, a plurality of data packets for a single customer-edge virtual local area network (CVLAN) may be identified and a CE-VLAN identifier may be at least partially removed from the Ethernet header of each of the data packets. Additionally, the CE-VLAN ID may be distributed across the data packets, such that a different portion of the CE-VLAN ID is included in each of the Ethernet headers of the data packets.

Table 4 illustrates pseudo-code for implementing the method 600 described above. Of course, it should be noted that the pseudo-code shown in Table 4 is set forth for illustrative purposes only and thus should not be construed as limiting in any manner.

TABLE 4

For the first Ethernet packet of a particular CVLAN:

Step 1: POP (802.1Q, 4). //Remove the last 8 bits of CE-VLAN tag
Step 2: Add PE-VLAN tag. OR (TPID$_{PE-VLAN}$, 0xFF01) //Add PE-VLAN Tag and make the last bit of it as 1
For the second Ethernet packet of the same CVLAN:

Step 3: Var$_{partVlanId}$ =POP (802.1Q, 4)
Step 4: AND (0xF0, 3rd byte of CE-VLAN)
Step 5: OR (Shift Right (Var$_{partVlanId}$, 4), 3rd byte of CE-VLAN) //move the first four bits of last CE-VLAN byte to last 4 bits of 3rd CE-VLAN byte
Step 6: Add PE-VLAN tag. OR (TPID$_{PE-VLAN}$, 0xFF02) //Add PE-VLAN Tag and make the last 2 bits of it as 10
For the third Ethernet packet of the same CVLAN:

Step 6: Var$_{partVlanId}$ =POP (802.1Q, 4)
Step 7: AND (0xF0, 3rd byte of CE-VLAN)
Step 8: OR (AND (Var$_{partVlanId}$, 0x0F), 3rd byte of CE-VLAN) //move the first four bits of last CE-VLAN byte to last 4 bits of 3rd CE-VLAN byte
Step 9: Add PE-VLAN tag. OR (TPID$_{PE-VLAN}$, 0xFF03) //Add PE-VLAN Tag and make the last 2 bits of it as 11

In one embodiment, at the egress edge (of the service provider's network), the CE-VLAN ID may be restored by buffering the data packets and combining the distributed 4 bits CE-VLAN ID using the last two bits of PE-VLAN TPID and the list of valid VLAN IDs supported.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
   computer code for identifying data to be communicated over a network;
   computer code for generating at least one data packet for use in communicating the data over the network, wherein each data packet includes an 802.1Q Ethernet header; and
   computer code for modifying the Ethernet header to reduce a size of the at least one data packet, where the Ethernet header is modified by:
      identifying a plurality of data packets for a single customer-edge virtual local area network (CE-VLAN);
      at least partially removing a CE-VLAN identifier (CE-VLAN ID) from the Ethernet header of each of the data packets; and
      distributing the CE-VLAN ID across the data packets, such that a different portion of the CE-VLAN ID is included in each of the Ethernet headers of the data packets.

2. The computer program of claim 1, wherein the computer program is operable such that data is identified by a device utilized for communicating the data over the network.

3. The computer program of claim 1, wherein the computer program is operable such that the data is identified in response to a request to communicate the data over the network.

4. The computer program of claim 1, wherein the computer program is operable such that the Ethernet header is modified by removing a first eight bits of a virtual local area network identifier from a tag of the Ethernet header, and overriding a last eight bits of a tag protocol identifier included in the tag of the Ethernet header with the first eight bits of the virtual local area network identifier.

5. The computer program of claim 4, wherein the computer program is operable such that the modification to the Ethernet header reduces a size of each of the at least one data packet by two bytes.

6. The computer program of claim 1, wherein the generation of the at least one data packet and the modification of the Ethernet header is performed at a router using the at least one data packet to communicate the data over the network.

7. A method, comprising:
   identifying data to be communicated over a network;
   generating at least one data packet for use in communicating the data over the network, wherein each data packet includes an 802.1Q Ethernet header; and
   modifying the Ethernet header to reduce a size of the at least one data packet, where the Ethernet header is modified by:
      identifying a plurality of data packets for a single customer-edge virtual local area network (CE-VLAN);
      at least partially removing a CE-VLAN identifier (CE-VLAN ID) from the Ethernet header of each of the data packets; and
      distributing the CE-VLAN ID across the data packets, such that a different portion of the CE-VLAN ID is included in each of the Ethernet headers of the data packets.

8. A system, comprising:
a processor for:
   identifying data to be communicated over a network;
   generating at least one data packet for use in communicating the data over the network, wherein each data packet includes an 802.1Q Ethernet header; and
   modifying the Ethernet header to reduce a size of the at least one data packet, where the Ethernet header is modified by:
      identifying a plurality of data packets for a single customer-edge virtual local area network (CE-VLAN);
      at least partially removing a CE-VLAN identifier (CE-VLAN ID) from the Ethernet header of each of the data packets; and
      distributing the CE-VLAN ID across the data packets, such that a different portion of the CE-VLAN ID is included in each of the Ethernet headers of the data packets.

9. The system of claim 8, wherein the processor is coupled to memory via a bus.

* * * * *